March 31, 1964 R. J. FOSTER 3,127,591
OFFSET MAGNETIC CORE
Filed Jan. 29, 1962

*INVENTOR.*
ROBERT J. FOSTER
*BY*
[signature]
ATTORNEY

United States Patent Office 3,127,591 Patented Mar. 31, 1964

3,127,591
OFFSET MAGNETIC CORE

Robert J. Foster, Munroe Falls, Ohio, assignor to Goodyear Aerospace Corporation, a corporation of Delaware Filed Jan. 29, 1962, Ser. No. 169,457
5 Claims. (Cl. 340—174)

The present invention relates to magnetic cores and more particularly to novel square-looped ferrite magnetic cores usable in logic mechanization systems suitable for digital computers and data processors.

Magnetic core circuits capable of performing digital logic storage have been known for a number of years. These circuits have used toroidal magnetic cores as the primary logic and storage elements. The circuits are constructed as an array of magnetic cores of toroidal shape arranged in rows and columns. Each row and column of cores is linked by a separate conducting wire. An output winding links the cores and senses the switching of the flux pattern in any particular core. The cores may be supported by a non-conducting member or by the conductor wires. The resulting magnetic matrix does not have thermoequilibrium. The temperature of the particular cores throughout the matrix differs because of unequal heat transfers throughout the matrix.

Each time the direction of the flux pattern of a core switches a quantity of electrical energy, proportional to the area enclosed by the hysteresis loop, is converted to heat. An increase in the temperature of the magnetic material of the core modifies its magnetic properties. Heating of the material sets a limit to the number of times a second a magnetic core may be switched. If the number of reversals is too great the core loses its switching properties.

It is the general object of the invention to avoid and overcome the foregoing and other difficulties of the prior art practice by the provision of a novel offset magnetic core positioned in a simple and compact magnetic core assembly.

Another object of the invention is to provide magnetic matrix which has uniform heat transfer characteristics.

Another object of the invention is to provide an offset magnetic core which permits the stacking of the cores between heat conductive members.

Another object of the invention is to provide a magnetic matrix which is easily fabricated and repaired.

According to the invention, the magnetic matrix comprises a plurality of offset magnetic cores arranged in rows and columns. Each core is cylindrical in shape and has a base portion connected to a top portion by a pair of side portions. The base portion and top portion contains longitudinally spaced substantially parallel surfaces which extend substantially normal to the longitudinal axis of the core. The base portion is substantially diametrically opposed and longitudinally spaced from the top portion. A thermoconductive means engages the parallel surfaces of each core. The heat generated by the switching of the cores is conducted to the said means. A pair of first and second perpendicularly disposed drive windings are connected with each row of cores. A third conductor winding disposed perpendicular to the first and second windings passes through each column of cores and the thermoconductive means. This arrangement results in a magnetic matrix which is compact and has thermal stability.

The exact nature of this invention as well as other objects and advantages thereof will be readily apparent from a consideration of the following specification relating to the annexed drawings in which.

Figures 1, 2, 3, 4, 5:
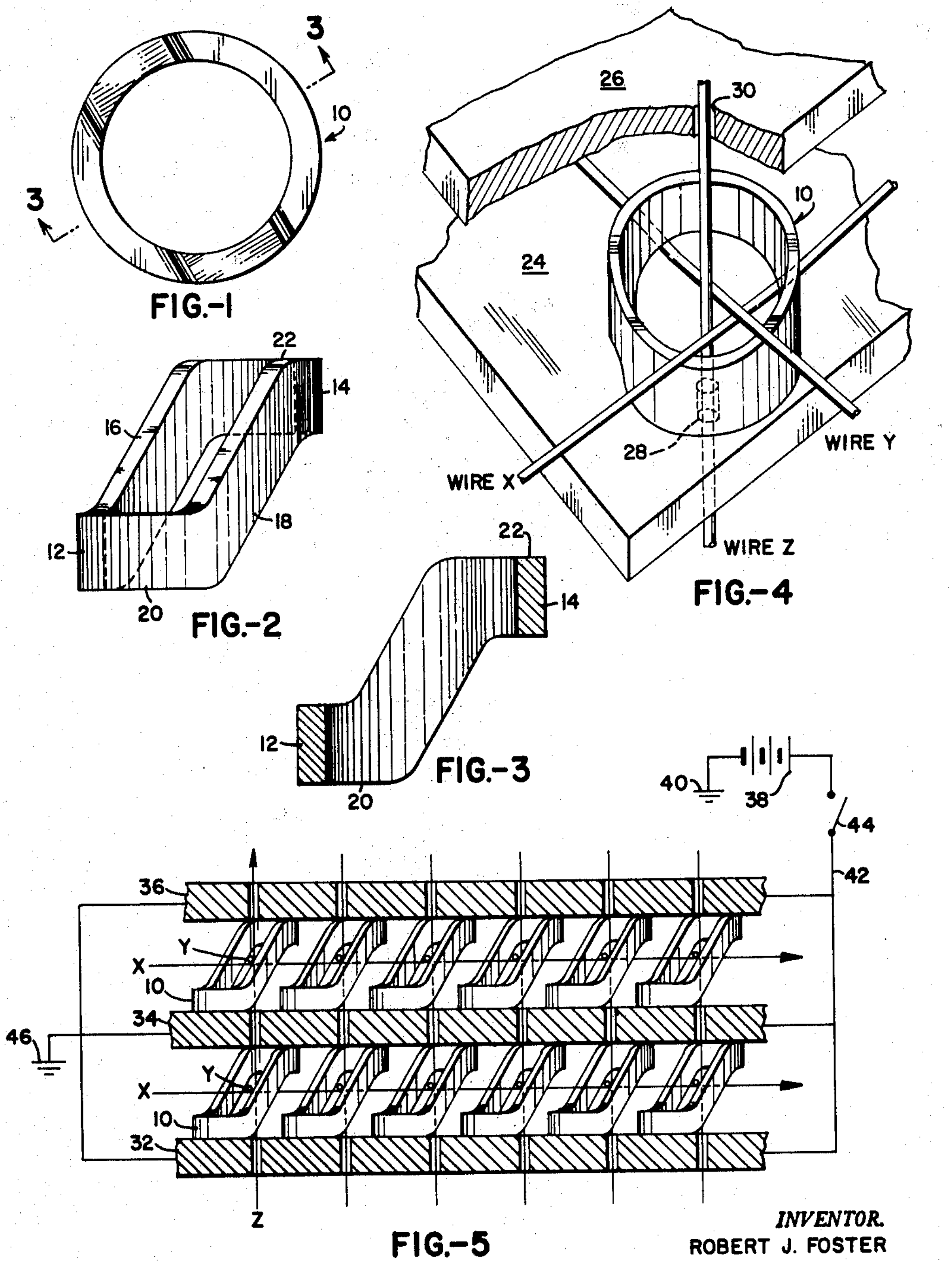
FIG. 1 is a plan view of an offset magnetic core.
FIG. 2 is an elevation view of the magnetic core shown in FIG. 1.
FIG. 3 is a sectional view of the magnetic core taken along the line 3—3 of FIG. 1.
FIG. 4 is a diagrammatic view of an offset magnetic core mounted between heat sink members.
FIG. 5 shows an array of offset magnetic cores stacked between thermocontrolling members forming a magnetic matrix.

Referring now to the drawings, there is shown in FIGS. 1, 2, and 3 an offset magnetic core 10. The core 10 is in the shape of a right circular cylinder and has a uniform internal diameter. The core 10 is subdivided into an arcuately shaped base portion 12, an arcuately shaped top portion 14, and side portions 16 and 18 interconnecting the base portion with the top portion. The base portion is diametrically opposed to and longitudinally spaced from the top portion. The base portion contains an arcuately shaped bottom surface 20 which lies in a plane that is normal to the longitudinal axis of the core. The top portion 14 contains an arcuately shaped top surface 22 which is parallel to the bottom surface 20. The cross-sectional area throughout the various portions of the cores is uniform.

FIG. 4 shows an offset core 10 sandwiched between a pair of plates 24 and 26. These plates are formed from a material that is non-magnetic and has high heat conductivity characteristic. Aluminum or beryllium plates may be effectively used. The core is positioned between the plates so that the arcuate bottom and top surfaces are in surface engagement with the plates.

The core 10 is wound with an X conductor wire which extends straight through the core orifice. A Y conductor wire extends straight through the core orifice perpendicular to the extent of the X conductor wire. A Z conductor wire extends through the core orifice normal to the plane established by the X and Y conductor wires. The plate 24 has an orifice 28 and the plate 26 has an orifice 30 permitting the Z conductor wire to extend through the plates and additional cores.

Referring to FIG. 5, a plurality of offset magnetic cores 10 are sandwiched between plates 32, 34, and 36. These plates are formed from a material that is non-magnetic and has high heat conductivity characteristics. The cores 10 are arranged in horizontal rows and in vertical columns. The substantially parallel surfaces of each core are in surface engagement with the plates enabling the heat generated in the cores to be conducted to the plates.

An X conductor wire horizontally passes through each core in a row of cores. A Y conductor wire horizontally passes through each core in a row of cores that are disposed perpendicular to the row of cores common to the X conductor wire. A Z conductor wire extends vertically through the columns of cores and through the respective plates between the rows of cores.

The plates 32, 34, and 36 may be heated to provide the magnetic matrix with a uniform temperature. A source of electrical power 38 is connected to the ground 40 and to a line 42. The line 42 is connected to the respective plates. A switch 44 positioned in the line 42 is operable to control the heating of the plates. Each of the plates is connected to a ground 46 to complete the electrical circuit. The plates 32, 34 and 36 function as resistors and thus dissipate heat to the cores in contact with the plates. Each of the plates may include a separate heating element connected to the electric line 42. The heating element functions to increase the temperature of the plates and to provide the magnetic matrix with uniform thermal characteristics.

While there have been shown and described and pointed out the fundamental novel features of the invention as applied to preferred embodiments it will, of course, be understood that various omissions, substitutions, changes in form, and details of the apparatus illustrated and its operation may be made by those skilled in the art, without departing from the spirit of the invention. It is the intention, therefore, to be limited only as indicated by the scope of the following claims.

What is claimed is:

1. A magnetic matrix comprising a plurality of offset magnetic cores arranged in rows and columns, each core having a base portion, a top portion, said base portion and top portion having longitudinally spaced substantially parallel surfaces which extend substantially normal to the longitudinal axis of the core, said base portion being diametrically opposed to and longitudinally spaced from the top portion, and side portions connecting the base portion with the top portion, thermoconductive means in surface engagement with the parallel surfaces of each core, said means being positioned between the rows of cores, a first conductor means extending through the conductive means and the columns of cores, a second conductor means extending through a first row of cores substantially normal to the first conductor means, and a third conductor means extending through a second row of cores substantially normal to the first row of cores, said third conductor means being substantially normal to said first and second conductor means.

2. A magnetic matrix comprising a plurality of offset magnetic cores arranged in rows and columns, each core having a base portion, a top portion, said base portion and top portion having longitudinally spaced substantially parallel surfaces which extend substantially normal to the longitudinal axis of the core, said base portion being diametrically opposed to and longitudinally spaced from the top portion, and side portions connecting the base portion with the top portion, thermoconductive means in surface engagement with the parallel surfaces of each core, said means being positioned between the rows of cores, means to heat the conductive means to maintain a constant temperature throughout the matrix, a first conductor means extending through the conductive means and the columns of cores, a second conductor means extending through a first row of cores substantially normal to the first conductor means, and a third conductor means extending through a second row of cores substantially normal to the first row of cores, said third conductor means being substantially normal to said first and second conductor means.

3. In a magnetic matrix, a cylindrical offset magnetic core having a base portion and a top portion, said portions including longitudinally spaced substantially parallel surfaces which extend substantially normal to the longitudinal axis of the core, the base portion being diametrically opposed to and longitudinally spaced from the top portion, and thermoconductive means in surface engagement with the parallel surfaces of the core.

4. An offset magnetic core having a base portion, a top portion, the base portion being diametrically opposed to and longitudinally spaced from the top portion, and side portions connecting the base portion with the top portion.

5. An offset cylindrical magnetic core having a one-piece hollow cylindrical body of uniform wall thickness and including a base portion, a top portion, said base portion and top portion being less than about half round and being diametrically opposed to and axially spaced from each other, and angularly extending side portions connecting the base portion with the top portion, said side portions being of greater axial length than the axial length of the base and top portions whereby straight wires representing X, Y, and Z axes can be extended through the center of the core.

References Cited in the file of this patent

UNITED STATES PATENTS

| | | |
|---|---|---|
| 2,823,372 | Jones | Feb. 11, 1958 |
| 2,919,434 | Mestre | Dec. 29, 1959 |